US 6,609,456 B1

(12) United States Patent
Schneider

(10) Patent No.: US 6,609,456 B1
(45) Date of Patent: Aug. 26, 2003

(54) HAND-HELD HOUSEHOLD CONTAINER COMPRESSING DEVICE

(76) Inventor: Kenneth George Schneider, 1927 18th St., Santa Monica, CA (US) 90404

( * ) Notice: Subject to any disclaimer, the term of this patent is extended or adjusted under 35 U.S.C. 154(b) by 0 days.

(21) Appl. No.: 09/575,772

(22) Filed: May 22, 2000

Related U.S. Application Data

(60) Provisional application No. 60/135,642, filed on May 24, 1999.

(51) Int. Cl.⁷ .................................................. B30B 1/00
(52) U.S. Cl. ....................................... 100/265; 100/902
(58) Field of Search .............................. 100/265, 902

(56) References Cited

U.S. PATENT DOCUMENTS

| 4,213,384 A | * | 7/1980 | Telling ......................... 100/209 |
| 5,265,530 A | | 11/1993 | Perchacs |
| 5,448,946 A | | 9/1995 | Laux |
| 5,802,968 A | | 9/1998 | Kirschner |
| 5,832,818 A | * | 11/1998 | Menzak, Jr. ................. 100/250 |
| 5,937,747 A | * | 8/1999 | Kahil ........................... 100/265 |

* cited by examiner

*Primary Examiner*—William Hong

(57) ABSTRACT

A hand held device for compressing used or empty household containers consists generally of a long, straight handle and a small non-slip base. The handle has a hole in the center to receive the top of the container. The handle has rounded points protruding from the bottom, near the hole that receives the container top. As one slowly pushes the handle downward the points push on the structure of the top of the container. This creates points of failure, and allows the container to be crushed downward in a simple, slow, smooth manner, requiring very little downward force. The non-slip base, where the container is placed before compressing, keeps the container from slipping during compression. Before the container is compressed, the cap is loosened to let air out as it compresses. Once it is compressed, the cap is tightened, so the container remains compressed.

9 Claims, 3 Drawing Sheets

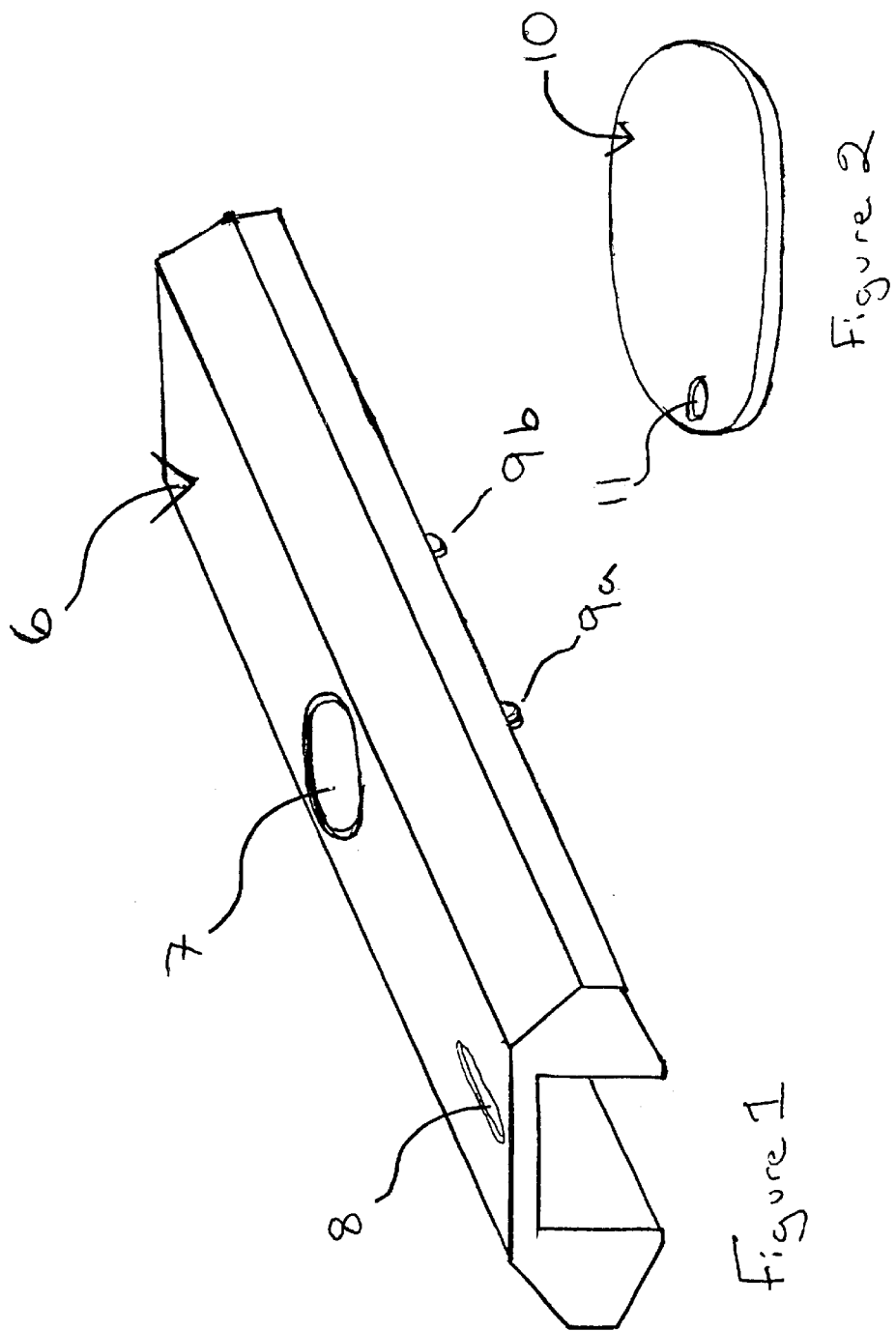

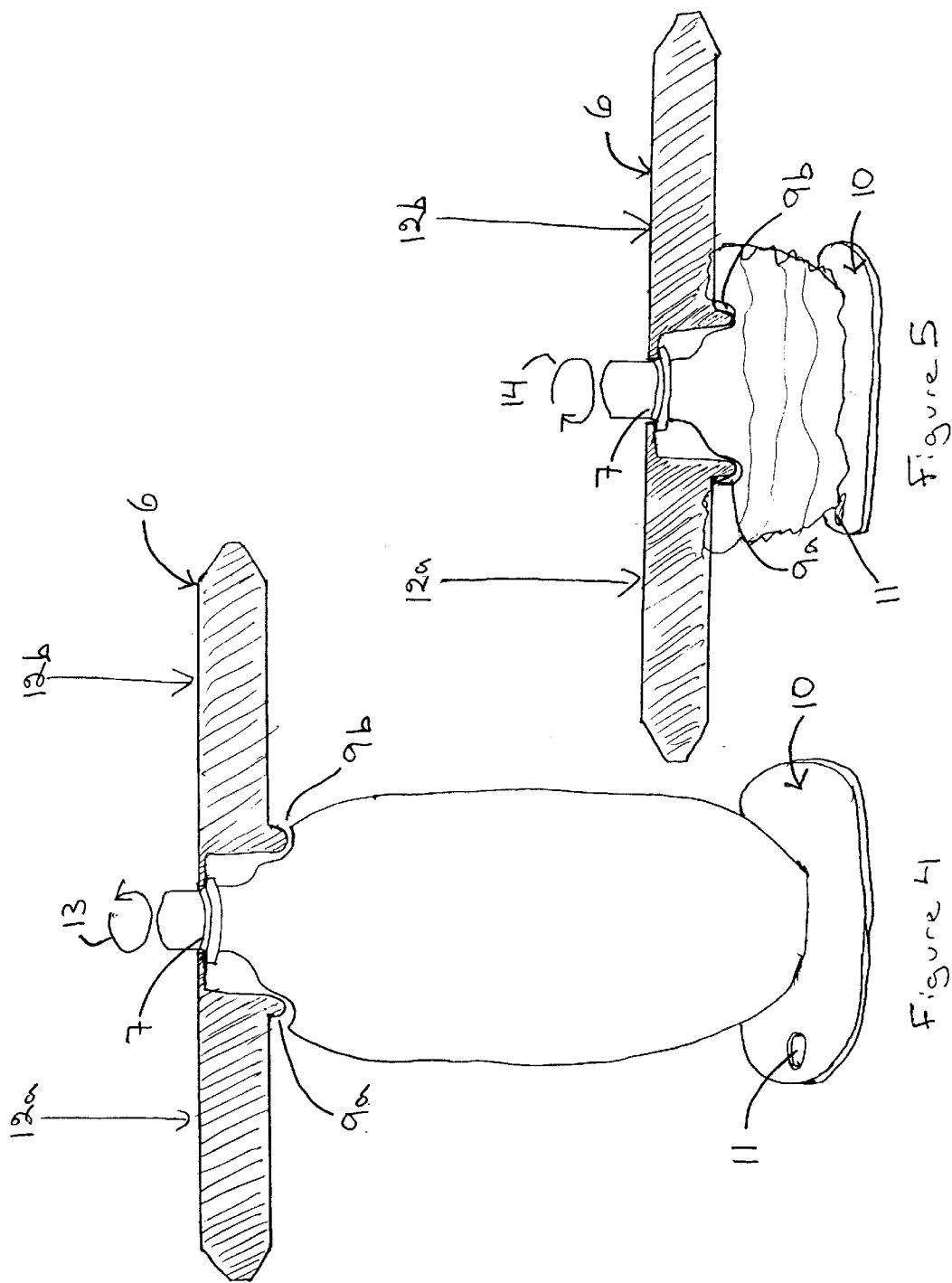

HAND-HELD HOUSEHOLD CONTAINER COMPRESSING DEVICE

CROSS-REFERENCE TO RELATED APPLICATIONS

This application claims the benefit of Provisional Patent Application Serial No. 60/135,642, filed May 24, 1999.

BACKGROUND

1. Field of Invention

This invention relates to used, or empty, household packaging containers, specifically to a hand-held compressing device generally used to reduce the amount of storage space required by these used or empty containers, in households or businesses.

2. Discussion of Prior Art

As our society continues to move toward efficiency and increased consumption, we are faced with the problems of more waste being created by households and businesses as they consume products. Although we are moving toward recycling to help save on the need for more raw materials, we still have the problem of where to put the containers we empty until recycling/garbage trucks take them away. These products could consist generally of plastic containers, paper products, or soft metals such as aluminum. Until now, there have been instruments designed and patented to crush these types of containers, but they used levers and or cranks to create a force great enough to compress the containers. This results in the need to take up a lot of space and or the need to mount the mechanism on a wall or similar structure. Thus, resulting in the inefficient use of space, or added labor just to make the mechanism usable. In U.S. Pat. No. 5,265,530 assigned to Jawz, Inc. and U.S. Pat. No. 5,802,968 assigned to The Coca-Cola Company one or more hinged parts are used to generate a leverage point, so that enough force can be generated to crush the used or empty household containers. The use of the levers in both of these examples means that the mechanism must be secured to a wall or similar structure before use. Finding a proper structure that can hold these mechanisms can be difficult in itself in several ways. The place must be structurally sound with plenty of space to properly operate the mechanism, and be out of the way so that the mechanism won't be "offensive" to the eye, as it will be visible to anyone present in the area it is secured. This may result in the mechanism being placed in an inappropriate spot. Then there is the potential difficulty in properly mounting the mechanism, which could require the finding wall studs and drilling. In U.S. Pat. No. 5,448,946 to Laux, opposing cranks are proposed which make it possible to set on a counter, but, again, it will take up quite a bit of counter space, as well as being large and cumbersome. If Laux's one sided lever idea is used, the mechanism must again be mounted in some way presenting the problems already discussed.

All three inventions end up crushing or compressing the containers, but, in the use of the levers or gears, which help to create greater force in relation to how much force the consumer applies, they are more complex. They do not use the inherent design of these containers, which if used properly, will make the compressing of them require much less force, and will also help maintain their compressed size. All three designs call for the removal of the cap and don't call for its replacement, which means that air can get back in, and most containers will naturally expand when the force is released, thus increasing the final "compressed" size. And the objective is to make the containers as small as possible.

The lever arms add to the number of parts required to build the product for the manufacturer, thus increasing its cost, or creating the previously mentioned problems in the mounting or storage of the mechanisms.

OBJECTS AND ADVANTAGES

Accordingly, several objects and advantages of my invention are:

a) that it is a simple one-piece, hand-held, device that requires no additional mounting procedures, and can easily be placed out of the way, in a drawer, transported on trips, or hung in an out-of-site location;

b) that it takes advantage of the inherent design of these types of containers by causing "failure points" in their structure, so it is very easy to crush—for men, women and teenagers; and c) that it also takes advantage of the re-tightening of the cap after compression, so that air can't escape and the compressed containers stay as small as possible.

DRAWING FIGURES

FIG. 1 is a perspective view of the device, cut off at the ends so the shape of the device is visible.

FIG. 2 is a perspective view of the non-slip pad.

FIG. 4 is a cutout view of the device as it ready for use.

FIG. 5 is a cutout view that shows the device after it has compressed the container.

SUMMARY

Figure 3:
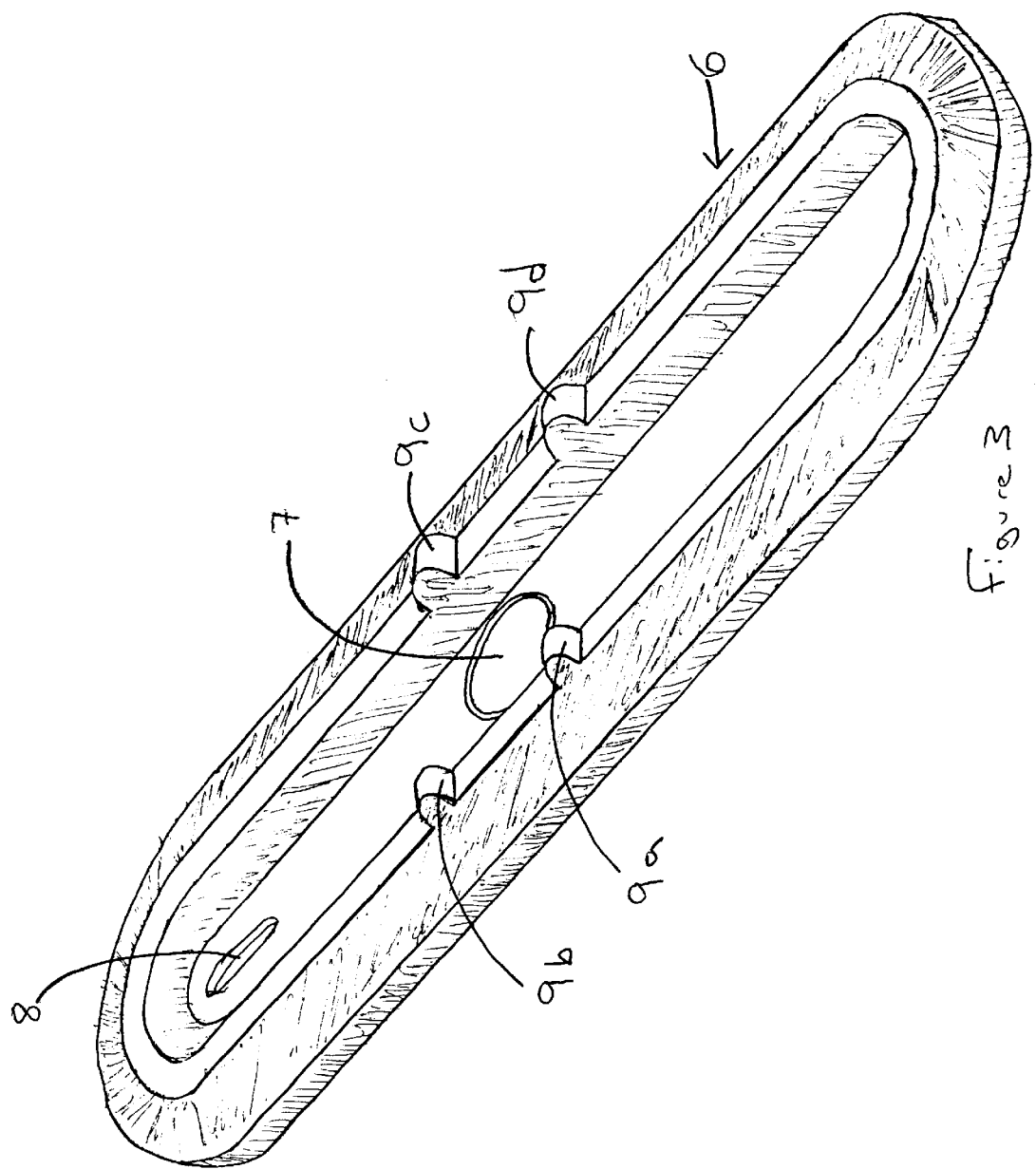
FIG. 3 is a perspective view of the underside of the device.

In accordance with the present invention a hand-held household container compressing device comprises a simple one-piece tool whose design makes compressing used household containers, generally but not limited to beverage containers, after use very easy for men, women and teenagers. Its design causes the structure of the container to fail in a consistent and calculated manner, thus requiring little skill or force to compress the empty containers straight down into a small size.

DESCRIPTION

FIG. 1 is a perspective view of the device, cut off at the ends so the shape of the device is visible. The device 6 is one piece, which has several features. The hole 7 is in the center of the device. Protrusions 9a and 9b are rounded and extend from the bottom of the device. The hole 8 is located at one end of the device.

FIG. 2 is a piece of material 10 that has the characteristic of high friction on a variety of surfaces, as well as high friction against the containers placed on it. A hole 11 is located near the edge of the material.

FIG. 3 is a perspective view of the underside of the device. Here, you can see all of the features as in FIG. 1, with the addition of protrusions 9c and 9d. These are the same as protrusions 9a and 9b.

OPERATION

FIG. 4 is a cutout view of the device as it ready for use and compression is just begun. The container is placed on the non-slip pad 10, and the device 6 is placed on the container. Then the cap is loosened (turned counter clockwise) 13 slightly, so that air may escape as the container is compressed. Then a person places their hands on the device and evenly applies a downward pressure 12a and 12b. Protrusions 9a and 9b (and FIG. 3, Protrusions 9c and 9d not shown) cause the container to fail ("failure points") as the device pushes downward as shown. As the container's structure fails in a systematic and symmetric fashion, it compresses straight down with very little force.

FIG. 5 is a cutout view that shows the device after the container has been compressed. As the person finishes compressing the container as far as it will go with their downward force 12a and 12b, they, while maintaining a downward force with one hand 12a or 12b tighten the cap (turned clockwise) 14 with the other hand. This keeps air from reentering the compressed container, thus not allowing it to expand. The device is simply separated from the device 6 and the task is complete with the container approximately ¼ its original size, and the device 6 and non-slip pad 10 can easily be stored until they are needed again.

CONCLUSIONS, RAMIFICATIONS, AND SCOPE

Thus the reader will see that the compressing device invention described provides a very simple, hand-held device that can easily compress used or empty household containers, and can be used by men, women, and teenagers alike. It can be made of a lightweight material, and easily stored out if site in a drawer or hung anywhere on a wall. Due to its simplicity, and ease of manufacturing it can be provided to consumers at a very economical price, which will help encourage its use, thus helping encourage the process of reducing wasted space and potentially increasing the process of recycling.

While my above description contains many specificities, these should not be construed as limitations on the scope of the invention, but rather as an exemplification of one preferred embodiment thereof. Many other variations are possible. For example, the protrusions may be hinged, or of different shapes, or the device may have a different, more ergonomic design, or fold so it is even smaller when stored, or have different color variations, or may not even have a non-slip pad, but in the end, the function, and end result will be the same.

Accordingly, the scope of the invention should be determined not by the embodiment(s) illustrated, but by the appended claims and their legal equivalents.

I claim:

1. A container crusher for crushing a pliable container by exerting downward pressure along the top of the container, the container crusher comprising:

an elongated structure, said structure having an opening formed therein to receive a neck of the container; and a plurality of blunt protrusions that extend outwardly from said elongated structure and that are located proximate to said opening such that application of a downward force causes said plurality of blunt protrusions to press against the container proximate to the neck of said container without piercing the container, thereby causing the container to fail structurally.

2. A container crusher according to claim 1, wherein the opening for receiving the container neck is located at the center of the elongated structure.

3. A container crusher according to claim 1, wherein said plurality of blunt protrusions comprises two blunt protrusions that are located across from each other with respect to said opening.

4. A container crusher according to claim 3, wherein said plurality of blunt protrusions comprises two additional blunt protrusions that are located across from each other with respect to said opening.

5. A method of crushing a pliable container having a top comprising a neck, said method comprising:

(a) providing a container crusher, wherein said container crusher comprises an elongated structure having an opening formed therein and further comprises a plurality of blunt protrusions that extend outwardly from the elongated structure and that are located proximate to said opening;

(b) engaging the neck of the container in said opening of the crusher;

(c) supporting a bottom of the container; and (d) applying downward force such that said plurality of blunt protrusions press against the top of said container without piercing the container thereby causing the container to fail structurally.

6. The method of claim 5, wherein step (c) comprises placing the bottom of said container on a non-slip pad.

7. The method of claim 5, wherein the container crusher provided in step (a) has the opening located at the center of the elongated structure.

8. The method of claim 7, wherein the plurality of blunt protrusions of the container crusher provided in step (a) comprises two blunt protrusions that are located across from each other with respect to said opening.

9. The method of claim 8, wherein said plurality of blunt protrusions comprises two additional blunt protrusions that are located across from each other with respect to said opening.

\* \* \* \* \*